(12) United States Patent
Sawada et al.

(10) Patent No.: US 12,467,884 B2
(45) Date of Patent: Nov. 11, 2025

(54) X-RAY IMAGING SYSTEM AND X-RAY IMAGE ANALYSIS METHOD

(71) Applicant: Shimadzu Corporation, Kyoto (JP)

(72) Inventors: Ryuji Sawada, Kyoto (JP); Hitomi Yoshiyama, Kyoto (JP); Hiroaki Tsushima, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 244 days.

(21) Appl. No.: 18/364,603

(22) Filed: Aug. 3, 2023

(65) Prior Publication Data
US 2024/0044810 A1    Feb. 8, 2024

(30) Foreign Application Priority Data
Aug. 4, 2022    (JP) ................... 2022-124765

(51) Int. Cl.
*G01N 23/04*     (2018.01)
*G01N 23/083*    (2018.01)
*G06T 7/73*      (2017.01)

(52) U.S. Cl.
CPC ......... *G01N 23/043* (2013.01); *G01N 23/083* (2013.01); *G06T 7/74* (2017.01); *G06T 2207/10116* (2013.01); *G06T 2207/20081* (2013.01)

(58) Field of Classification Search
None
See application file for complete search history.

(56) References Cited

U.S. PATENT DOCUMENTS

| | | | |
|---|---|---|---|
| 6,665,433 B2 * | 12/2003 | Roder | G06T 7/521 |
| | | | 382/106 |
| 2019/0302043 A1 * | 10/2019 | Lobastov | B22F 10/38 |
| 2021/0042917 A1 * | 2/2021 | Hirai | G06V 10/751 |

FOREIGN PATENT DOCUMENTS

JP    2011196983 A    10/2011

OTHER PUBLICATIONS

Shichiro, "Development of super high-speed CT X-ray automatic inspection system", Omron Technics, 2019, vol. 51, No. 1(162), pp. 91-97.

* cited by examiner

*Primary Examiner* — Hoon K Song
(74) *Attorney, Agent, or Firm* — Maier & Maier, PLLC

(57) ABSTRACT

In an X-ray imaging, first and second images of X-ray images corresponding to different emission angles are generated. In the X-ray imaging system, based on positions of a target part included in an inspection target in the first and second images, and an angle difference between the emission angles of X-rays that are emitted to generate the first and second images, a three-dimensional position of the target part is calculated by using triangulation.

11 Claims, 6 Drawing Sheets

X-RAY IMAGING SYSTEM AND X-RAY IMAGE ANALYSIS METHOD

CROSS-REFERENCE TO RELATED APPLICATIONS

The related application number JP2022-124765, an X-ray imaging system and an X-ray image analysis method, Aug. 4, 2022, Ryuji Sawada, Yoshiyama Hitomi, Hiroaki Tsushima upon which this patent application is based are hereby incorporated by reference.

FIELD

The present invention relates to an X-ray imaging system and an X-ray image analysis method, and particularly to an X-ray imaging system and an X-ray image analysis method of irradiating an inspection target with X-rays.

BACKGROUND

Conventionally, an apparatus irradiating an inspection target with X-rays is known. Such an apparatus is disclosed in Japanese Patent Laid-Open Publication No. JP 2011-196983, for example.

The above Japanese Patent Laid-Open Publication No. JP 2011-196983 discloses an apparatus (fluoroscopic inspection device) emitting an X-ray beam toward an electronic substrate on which a semiconductor element as an inspection target is mounted. This fluoroscopic inspection device detects the emitted X-ray beam and acquires a penetration image of the semiconductor element. In addition, the fluoroscopic inspection device disclosed in the above Japanese Patent Laid-Open Publication No. JP 2011-196983 measures existence of an air bubble included in solder of the semiconductor element based on the penetration image of the semiconductor element and determines soldering defects. Also, the fluoroscopic inspection device disclosed in the above Japanese Patent Laid-Open Publication No. JP 2011-196983 combines two images that are acquired based on the detected X-ray beams incident on the semiconductor element at different angles to remove a noise image of a foreign substance overlapping the semiconductor element.

However, in a case in which an inspection target is inspected by irradiation with X-rays as in the fluoroscopic inspection device disclosed in the above Japanese Patent Laid-Open Publication No. JP 2011-196983, the image generated for the inspection is a two-dimensional projection image generated from the emitted X-rays, and as a result it is difficult to detect a three-dimensional position of a target part included in the inspection target in a depth direction. For example, if electronic components that have the same shape are mounted on front and back surfaces of a substrate, it is difficult to determine whether a determined defect part is located on the front or back surface of the substrate. For this reason, it is conceivable that such difficulty in detection of the three-dimensional position of the target part included in the inspection target may make the inspection difficult. Also, in a case in which two images are combined to remove a noise image of a foreign substance overlapping the inspection target as in the fluoroscopic inspection device disclosed in the above Japanese Patent Laid-Open Publication No. JP 2011-196983, it is conceivable that the target part included in the inspection target may also be removed. For example, if electronic components as target parts to be inspected are mounted on front and back surfaces of a substrate with overlapping each other, one of the target parts on the front and back surfaces of the substrate will be removed as a noise image. Accordingly, it is conceivable that the removed target part will be excluded from inspection. From this viewpoint, in a case in which an inspection target including a target part is irradiation with X-rays so that the inspection target is inspected, it is desired to easily inspect the inspection target irrespective of a three-dimensional position of the target part in a depth direction.

SUMMARY

The present invention is intended to solve the above problems, and one object of the present invention is to provide an X-ray imaging system and an X-ray image analysis method capable of easily inspecting an inspection target including a target part irrespective of a three-dimensional position of the target part in a depth direction in a case in which the inspection target is irradiation with X-rays so that the inspection target is inspected.

In order to attain the aforementioned object, an X-ray imaging system according to a first aspect of the present invention includes an X-ray emitter configured to emit X-rays to an inspection target including an target part; an X-ray detector configured to detect the X-rays emitted from the X-ray emitter; an angle changer configured to change an emission angle of the X-rays to be emitted to the inspection target; an image generator configured to generate first and second images as X-ray images corresponding to different emission angles different from each other based on X-rays that are detected by the X-ray detector in irradiation of the inspection target with the X rays by the X-ray emitter under change of the emission angle by the angle changer; and an image analyzer configured to calculate a three-dimensional position of the target part by using triangulation based on positions of the target part included in the inspection target in the first and second images, which are generated by the image generator, and an angle difference between the different emission angles of the X-rays that are emitted to generate the first and second images.

An X-ray imaging system according to a second aspect of the present invention includes an X-ray emitter configured to emit X-rays to an inspection target including first and second target parts different from each other; an X-ray detector configured to detect the X-rays emitted from the X-ray emitter; an image generator configured to generate an X-ray image based on X-rays that are detected by the X-ray detector in irradiation of the inspection target with the X rays by the X-ray emitter; and an image analyzer configured to detect areas of the first and second target parts in the X-ray image with one being separated from another by using a learned model learning to discriminate between an overlapping part that is included as both the first and second target parts in the X-ray image, which is generated by the image generator, as viewed in an emission direction extending from the X-ray emitter toward the X-ray detector and a non-overlapping part that is included in only one of the first and second target parts based on the overlapping and non-overlapping parts discriminated as separated parts.

An X-ray image analysis method according to a third aspect of the present invention includes a step of acquiring first and second images of an inspection target including a target part as X-ray images corresponding to different emission angles different from each other generated based on X-rays that are detected in irradiation of the inspection target with the X rays under change of an emission angle with respect to the inspection target; and a step of calculating a three-dimensional position of the target part by using triangulation based on positions of the target part, which is included in the inspection target, in the first and second images, and an angle difference between the different emission angles of the X-rays that are emitted to generate the first and second images.

In the aforementioned X-ray imaging system according to the first aspect and the aforementioned X-ray image analysis method according to the third aspect, based on positions of a target part included in an inspection target in the first and second images, and an angle difference between emission angles of X-rays that are emitted to generate first and second images, a three-dimensional position of the target part is calculated by using triangulation. Accordingly, a three-dimensional position of a target part can be acquired which is calculated by using triangulation based on positions of a target part in first and second images and an angle difference between X-ray emission angles corresponding to the first and second images. Consequently, the inspection target can be inspected with the three-dimensional position of the target part being recognized. Therefore, even in a case in which an inspection target including a target part is irradiation with X-rays so that the inspection target is inspected, the inspection target can be easily inspected irrespective of a three-dimensional position of the target part in a depth direction.

In the aforementioned X-ray imaging system according to the second aspect of the present invention, areas of first and second target parts in an X-ray image can be detected with one being separated from another by using a learned model learning to discriminate between an overlapping part that is included as both the first and second target parts in the X-ray image, which is generated by the image generator, as viewed in an emission direction extending from the X-ray emitter toward the X-ray detector and a non-overlapping part that is included in only one of the first and second target parts based on the overlapping and non-overlapping parts discriminated as separated parts. Accordingly, even if the areas of the first and second target parts include such an overlapping part, the areas of the first and second target parts can be accurately detected with one being separated from another by using the learned model. Consequently, an inspection target can be inspected with its first and second target parts being separated from each other. Therefore, even in a case in which an inspection target including a target part is irradiation with X-rays so that the inspection target is inspected, the inspection target can be easily inspected irrespective of a three-dimensional position of the target part in a depth direction.

BRIEF DESCRIPTION OF THE DRAWINGS

FIG. 3 is a diagram showing an exemplary X-ray image 30a.

FIG. 4 is a diagram showing an exemplary X-ray image 30b corresponding to an emission angle different from the X-ray image 30a.

DETAILED DESCRIPTION

Embodiments embodying the present invention are hereinafter described on the basis of the drawings.

First Embodiment

Overall Configuration of X-Ray Imaging System

An X-ray imaging system 100 according to a first embodiment of the present invention is now described with reference to FIGS. 1 to 9.

Figure 1:
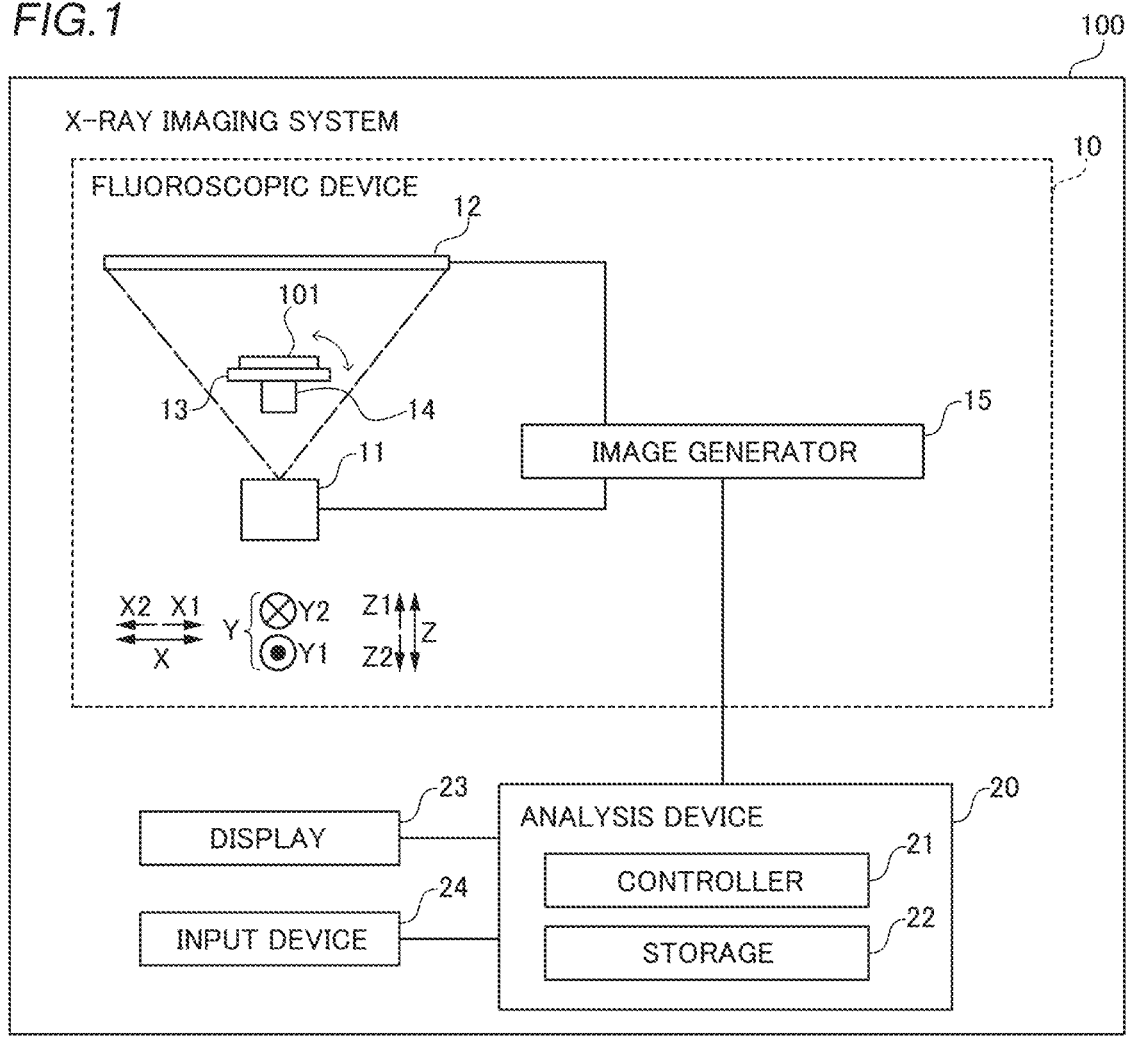
FIG. 1 is a block diagram showing the overall configuration of an X-ray imaging system according to a first embodiment of the present invention.

As shown in FIG. 1, the X-ray imaging system 100 according to the first embodiment can provide an internal image of an inspection target 101 by detecting X-rays that pass through the inspection target 101. For example, the X-ray imaging system 100 can be used for non-destructive inspection applications to provide an internal image of the inspection target 101 as an object.

Figure 2:
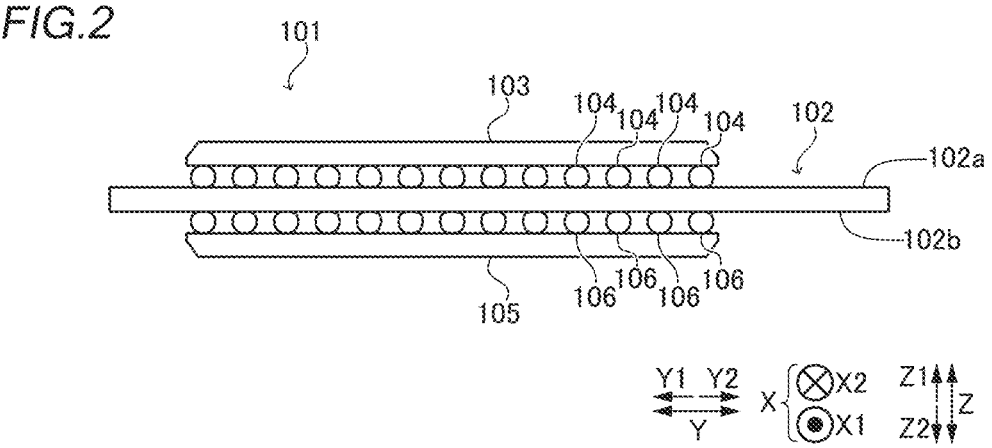
FIG. 2 is a schematic diagram showing arrangement of an inspection target including solder balls.

As shown in FIG. 2, the inspection target 101 is an electronic device including a substrate 102. The substrate 102 has a front surface 102a on a Z1 direction side (on an X-ray detector 12 side) and a back surface 102b on a Z2 direction side (on an X-ray emitter 11 side). An electronic component 103 is mounted on the front surface 102a of the substrate 102. Another electronic component 105 is mounted on the back surface 102b of the substrate 102. The electronic component 103 is electrically connected to the front surface 102a, which is located on the Z1 direction side of the substrate 102, by a plurality of solder balls 104 (bumps). The plurality of solder balls 104 are regularly arranged in a grid arrangement on the front surface 102a of the substrate 102. Also, the electronic component 105 is electrically connected to the back surface 102b, which is located on the Z2 direction side of the substrate 102, by a plurality of solder balls 106 (bumps). The plurality of solder balls 106 are regularly arranged in a grid arrangement on the back surface 102b of the substrate 102 similar to the plurality of solder balls 104. In other words, the electronic components 103 and 105 are connected to the substrate 102 by using a BGA (Ball Grid Array). The solder ball 104 is an example of a "target part", "first target part" or "first solder ball". The solder ball 106 is an example of a "target part", "second target part" or "second solder ball".

For example, in the inspection target 101, thirty nine solder balls 104 are arranged in a grip shape of three rows and thirteen columns on the front surface 102a of the substrate 102, and thirty nine solder balls 106 are similarly arranged in a grip shape of three rows and thirteen columns on the back surface 102b. The solder balls 104 on the front surface 102a of the substrate 102 and the solder balls 106 on the back surface 102b overlap each other as viewed in a direction (Z-direction) orthogonal to the front surface 102a of the substrate 102. For example, the electronic components 103 and 105 include an electronic circuit, such as IC (integrated circuit). The X-ray imaging system 100 can perform non-destructive inspection for a defect such as void (hole) in any of the solder balls 104 and 106, and solder bridging. Also, resistors, capacitors, etc. (surface-mount type but not shown) are mounted on the substrate 102 in addition to the electronic component 103.

As shown in FIG. 1, the X-ray imaging system 100 includes a fluoroscopic device 10 and an analysis device 20. The fluoroscopic device 10 can generate an X-ray image 30a (see FIG. 3) and an X-ray image 30b (see FIG. 4) by capturing X-ray images of the inspection target 101. The analysis device 20 can apply analysis processing to the generated X-ray images 30a and 30b. The fluoroscopic device 10 and the analysis device 20 include their communication module and can transmit/receive information to/from each other through a network, etc. The X-ray image 30a is an example of a "first image" or "X-ray image" in claims. The X-ray image 30b is an example of a "second image" or "X-ray image" in claims.

The fluoroscopic device 10 includes an X-ray emitter 11, an X-ray detector 12, a stage 13, a driver 14 and an image generator 15. The X-ray emitter 11 is configured to emit X-rays to the inspection target 101 including the plurality of solder balls 104 and the plurality of solder balls 106. The X-ray emitter 11 includes an X-ray tube as an X-ray source configured to emit X-rays when electric power is supplied from a power supply (not shown). The X-ray detector 12 is configured to detect X-rays emitted from the X-ray emitter 11. The X-ray detector 12 is configured to provide electrical signals in accordance with the detected X-rays. The X-ray detector 12 includes a flat panel detector (FPD) as a detector for detecting X-rays, for example. The X-ray emitter 11 and the X-ray detector 12 are arranged in a housing (not shown) of the fluoroscopic device 10. The driver 14 is an example of an "angle changer" in the claims.

The inspection target 101 is placed on the stage 13. The stage 13 is configured to be able to rotate about a Y-direction as rotation axis when receiving a driving force from the driver 14. The driver 14 is configured to rotate the stage 13 on which the inspection target 101 is placed about the Y-direction as rotation axis whereby change an orientation angle of the inspection target 101. In other words, the driver 14 can change an orientation angle of the inspection target 101 with respect to the X-ray emitter 11 whereby changing an emission angle of X-rays with which the inspection target 101 is irradiated. For example, the emission angle is represented by an angle of X-ray emission direction with respect to a direction a placement surface of the stage 13 on which the inspection target 101 is placed. The driver 14 operates based on signals from the image generator 15. The driver 14 includes a servomotor, for example. The "X-ray emission direction" refers to a direction extending from the X-ray emitter 11 toward the X-ray detector 12. Specifically, the X-ray emission direction is defined a three-dimensional depth direction extending from the X-ray source of the X-ray emitter 11, which is a point source of light, toward a central position of a detection surface of the X-ray detector 12.

Figure 3:
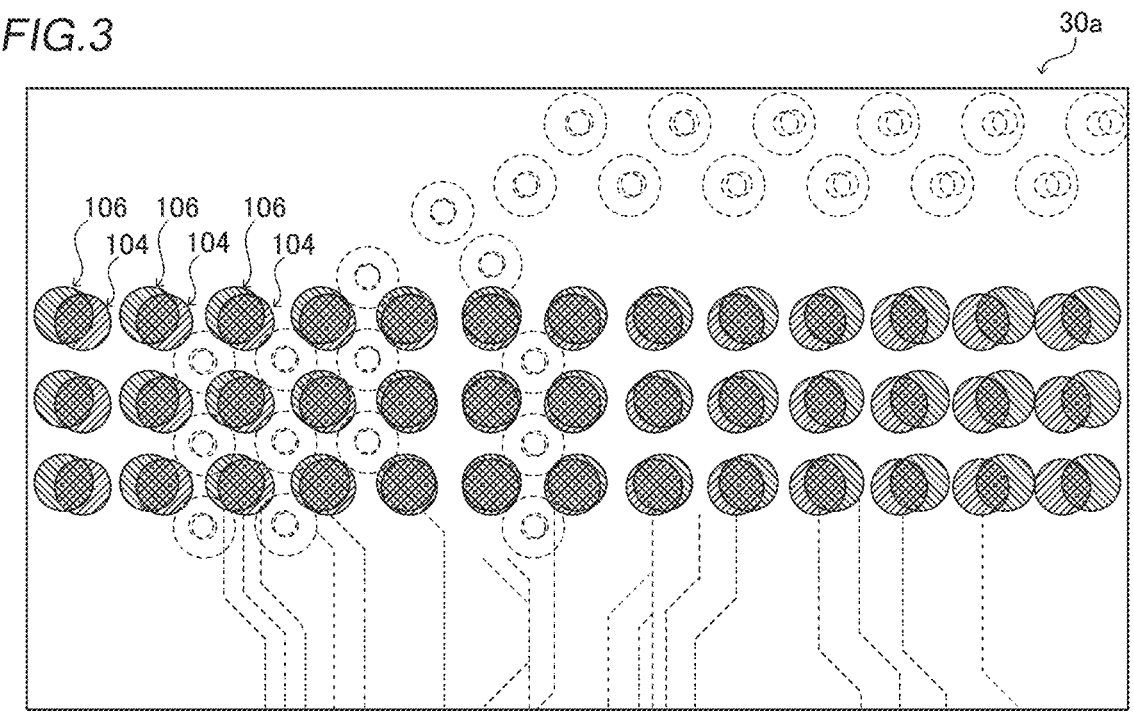
Figure 4:
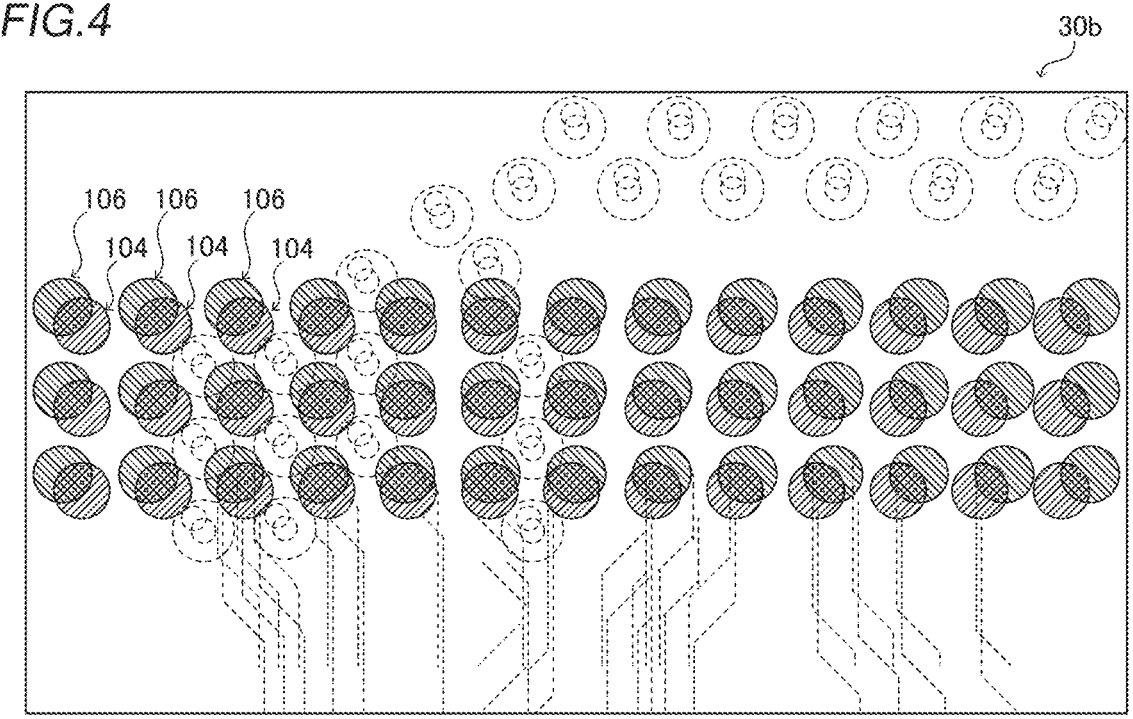

As shown in FIGS. 3 and 4, the image generator 15 is configured to generate X-ray images 30a and 30b based on X-rays detected by the X-ray detector 12. The X-ray images 30a and 30b are X-ray images corresponding to different emission angles different from each other generated based on X-rays that are detected when the inspection target is irradiated with the X-rays emitted by X-ray emitter 11 while the emission angle is changed by the driver 14. For example, the X-ray image 30a is an image that is captured when the emission direction (Z-direction), which is a direction extending from the X-ray emitter 11 toward the X-ray detector 12, substantially agrees with a direction orthogonal to a main surface (front surface 102a) of the substrate 102. Also, the X-ray image 30b is an image that is captured when the orientation angle of the inspection target 101 is rotated by 15 degrees about the Y-direction axis from the Z-direction.

Each of the X-ray images 30a and 30b includes the plurality of solder balls 104 and the plurality of solder balls 106, which are regularly arranged in a grid arrangement. Because the plurality of solder balls 104 and the plurality of solder balls 106, which are arranged on the substrate 102 in the inspection target 101, overlap each other, the X-ray images 30a and 30b include parts where the plurality of solder balls 104 and the plurality of solder balls 106 overlap each other. Because the X-ray images 30a and 30b correspond to different emission angles, their positional relationships between the plurality of solder balls 104 and the plurality of solder balls 106 are correspondingly different.

For example, the image generator 15 is a computer including a processor such as CPU (Central Processing Unit) and a storage device for storing information. The image generator 15 is configured to control operations of parts of the fluoroscopic device 10. For example, the image generator 15 can control the power supply (not shown) whereby controlling emission of X-rays emitted by the X-ray emitter 11. Also, the image generator 15 can control driving operation of the driver 14. Also, the image generator 15 can provide the generated X-ray images 30a and 30b to the analysis device 20.

As shown in FIG. 1, the analysis device 20 includes a controller 21 and a storage 22. For example, the analysis device 20 is a personal computer that is connected to and can communicate with the fluoroscopic device 10. The controller 21 includes a CPU, a read only memory (ROM), a random access memory (RAM), etc. The controller 21 can include a processor such as a graphics processing unit (GPU) or a field-programmable gate array (FPGA) configured for image processing. The controller 21 is an example of an "image analyzer" in the claims.

The storage 22 is configured to store various programs to be executed by the controller 21, and parameters. The storage 22 includes an HDD (Hard Disk Drive) or a non-volatile memory such as SSD (Solid State Drive), for example. Also, the storage 22 stores a learned model 50 (see FIG. 6) used for analysis of the X-ray images 30a and 30b.

A display 23 and an input device 24 are connected to the analysis device 20. The display 23 includes an LCD monitor, for example. The display 23 is configured to display images and text information based on the control by the controller 21. The input device 24 is configured to accept user inputs from users. The input device 24 includes a keyboard and a pointing device, such as a computer mouse, for example. The input device 24 can provide the user input signals in accordance with the accepted user inputs to the controller 21.

Analysis of X-Ray Image by Analysis Device

The analysis device 20 is configured to determine whether any defect occurs in the solder balls 104 and 106 based on X-ray images 30a and 30b generated by the image generator 15. Specifically, the analysis device 20 detects areas of the solder balls 104 and 106 from two X-ray images 30a and 30b corresponding to different emission angles. The analysis device 20 calculates three-dimensional positions including positions (positions in the direction orthogonal to the substrate 102) of the solder balls 104 and 106 in the emission direction (Z-direction) by using triangulation. In other words, the analysis device 20 calculates three-dimensional positions (coordinates) including positions of the solder balls 104 and 106 in the three-dimensional depth direction in X-ray images 30a and 30b by using triangulation. As a result, the analysis device 20 can determine whether any defect occurs in the solder balls 104 and 106 based on the detected areas of the solder balls 104 and 106, and determine whether the area that is determined as defect area is located on the front surface 102a or back surface 102b of the substrate 102 (in the solder ball 104 or the solder ball 106).

Figure 5:
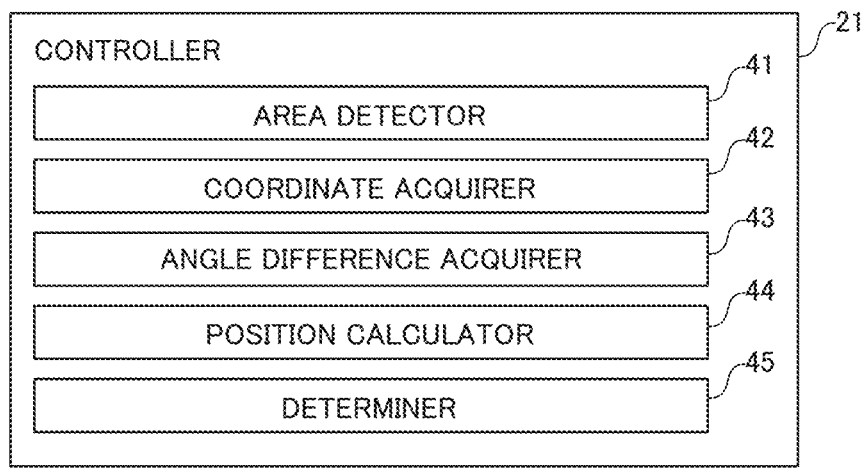
FIG. 5 is a block diagram illustrating the functional configuration of a controller.

Specifically, as shown in FIG. 5, the controller 21 includes an area detector 41, a coordinate acquirer 42, an angle difference acquirer 43, a position calculator 44 and a determiner 45. The controller 21 can serve as the area detector 41, the coordinate acquirer 42, the angle difference acquirer 43, the position calculator 44 and determiner 45 by executing various programs (software) stored in the storage 22. In other words, the area detector 41, the coordinate acquirer 42, the angle difference acquirer 43, the position calculator 44 and determiner 45 in FIG. 5 are represented as functional software blocks. The present invention is not limited to this, but some of or all of the area detector 41, the coordinate acquirer 42, the angle difference acquirer 43, the position calculator 44 and the determiner 45 can be constructed of a dedicated hardware circuit.

Figure 6:
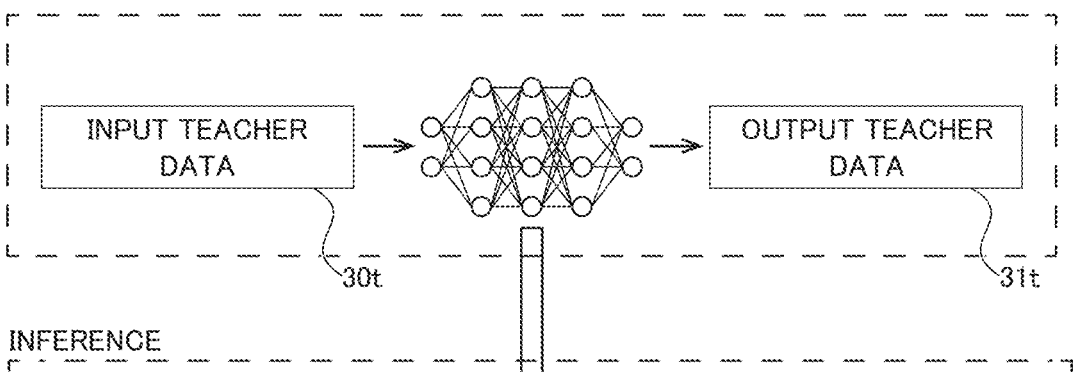
FIG. 6 is a diagram illustrating acquisition of discrimination result images by using a learned model.
Figure 6:
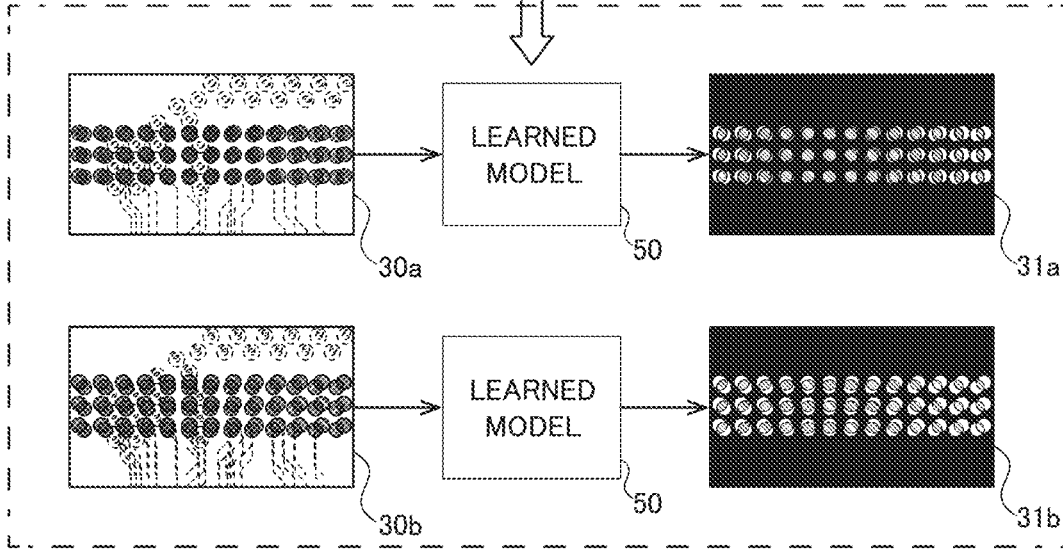

As shown in FIG. 6, the area detector 41 can acquire a discrimination result image 31a and a discrimination result image 31b from the X-ray image 30a and the X-ray image 30b, respectively, by using the learned model 50.

Figure 7:
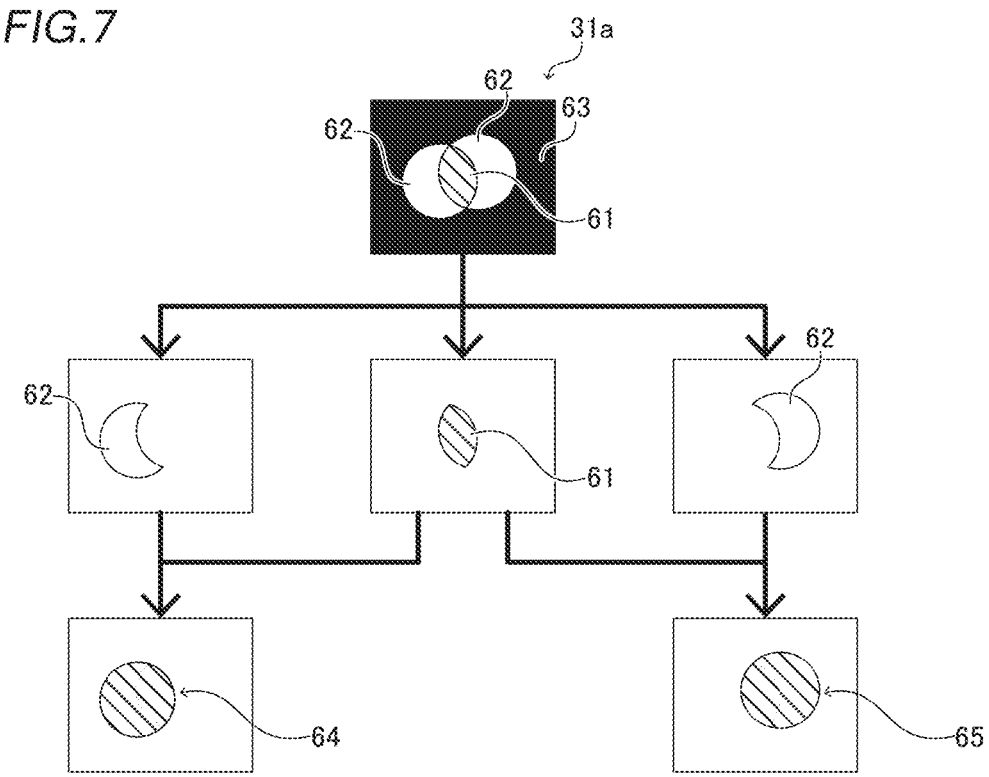
FIG. 7 is a diagram illustrating separation of areas of solder balls on front and back surfaces.

As shown in FIG. 7, the discrimination result image 31a is a label image including three types of discriminated areas of an overlapping part 61 where the solder ball 104 and the solder ball 106 on the both surfaces of the substrate 102 overlap each other as viewed in the emission direction (Z-direction), non-overlapping parts 62 each of which is a part included in only corresponding one of the solder ball 104 and the solder ball 106 but excluded from the overlapping part 61 (a part of one of the solder ball 104 and 106 that does not overlap another), and a background part 63 where neither the solder ball 104 nor the solder ball 106 exists. The overlapping part 61, the non-overlapping part 62 and the background part 63 are represented by gray, white and black, respectively, in the discrimination result image 31a. Note that the gray is represented by hatching in FIGS. 6 and 7. The same color representation as the discrimination result image 31a is applied to the discrimination result image 31b.

The learned model 50 is produced by leaning to discriminate between the overlapping part 61, the non-overlapping part 62 and the background part 63 as separated areas based on machine learning. The learned model 50 is produced based on machine learning using deep learning in which input teacher data 30t including sample X-ray images 30a and sample X-ray images 30b and output teacher data 31t including areas of overlapping, non-overlapping and background parts 61, 62 and 63 that have been discriminated and classified into the colors are provided as data sets. For example, the learned model 50 is produced by using machine learning based on U-Net, which is one type of Fully Convolutional Network (FCN). The learned model 50 is produced by leaning to classify each pixel in input images into the overlapping part 61, the non-overlapping part 62 or the background part 63, and convert the pixel to gray, white or black, respectively (image reconstruction). The area detector 41 is configured to acquire discrimination result images 31a and 31b as discrimination results (inference results) in which the overlapping part 61, the non-overlapping part 62 and the background part 63 are detected as separated areas discriminated by the learned model 50.

The area detector 41 can detect areas of the solder balls 104 and areas of the solder balls 106 in each of X-ray images 30a and 30b as shown in FIG. 7. The area detector 41 can detect areas of the plurality of solder balls 104 and areas of the plurality of solder balls 106 in each of X-ray images 30a and 30b by using the learned model 50 produced based on machine learning. Specifically, the area detector 41 can detect areas of the plurality of solder balls 104 and areas of the plurality of solder balls 106 in each of X-ray images 30a and 30b with one being separated from another based on the overlapping and non-overlapping parts 61 and 62 detected as separated areas in discrimination result images 31a and 31b. Although only one pair of solder balls 106 and 104 are illustratively shown in the exemplary discrimination result image 31a in FIG. 7, this discrimination processing is applied to all pairs of solder balls 106 and 104 pair by pair.

Specifically, the area detector 41 acquires the non-overlapping parts 62 as detection areas each of which corresponds to the solder ball 104 or the solder ball 106. Subsequently, the area detector 41 adds the overlapping part 61 that is positioned adjacent one detection area to the one detection area whereby detecting an area of one of the solder balls 104 and 106 with being separated from another. In other words, the area detector 41 can acquire areas 64 and 65 of the solder balls 104 and 106 with one being separated from another. Although the areas 64 and 65 separately represent the solder balls 104 and 106, it cannot be determined which of the areas 64 and 65 represents the area of the solder ball 104 and which represents the area of the solder ball 106 at this point.

Next, calculation is performed by using triangulation to determine which of the detected areas 64 and 65 represents the area of the solder ball 104 and which represents the area of the solder ball 106.

Calculation Using Triangulation

The coordinate acquirer 42 is configured to acquire positions of the solder balls 104 and the solder balls 106 in the X-ray image 30a and positions of the solder balls 104 and the solder balls 106 in the X-ray image 30b based on a set of the detected areas 64 and a set of the detected areas 65 one set of which corresponds to one of the plurality of solder balls 104 and the plurality of solder balls 106 and another set corresponds to another of the plurality of solder balls 104 and the plurality of solder balls 106. Specifically, the coordinate acquirer 42 can acquire centers of gravity of the set of the detected areas 64 and the set of the detected areas 65 each set of which corresponds to the plurality of solder balls 104 or the plurality of solder balls 106 as positions of the solder balls 104 and the solder balls 106 in the X-ray image 30a and positions of the solder balls 104 and the solder balls 106 in the X-ray image 30b. For example, the coordinate acquirer 42 extracts outlines of the detected areas 64 and 65 in the X-ray image 30a and outlines of the detected areas 64 and 65 in X-ray image 30b. Subsequently, the coordinate acquirer 42 acquires the centers of gravity the areas surrounded their extracted outline. The coordinate acquirer 42 then acquires acquired coordinates of the centers of gravity in the X-ray images 30a and 30b. The "centers of gravity" used here refer to geometric centers of the areas surrounded their extracted outline from a mathematical viewpoint. In other words, each center of gravity is a position of the average coordinates of points included in each area surrounded by its extracted outline.

The angle difference acquirer 43 is configured to acquire an angle difference between emission angles of X-rays that are emitted to generate the X-ray images 30a and 30b. The fluoroscopic device 10 can acquire the emission angles when the X-ray images 30a and 30b are generated. Subsequently, the fluoroscopic device 10 provides the analysis device 20 with the acquired emission angles each of which is assigned to the X-ray image 30b or 30a. The angle difference acquirer 43 acquires an angle difference between the emission angles corresponding to the X-ray images 30a and 30b based on the emission angles each of which is assigned to the X-ray image 30b or 30a.

Figure 8:
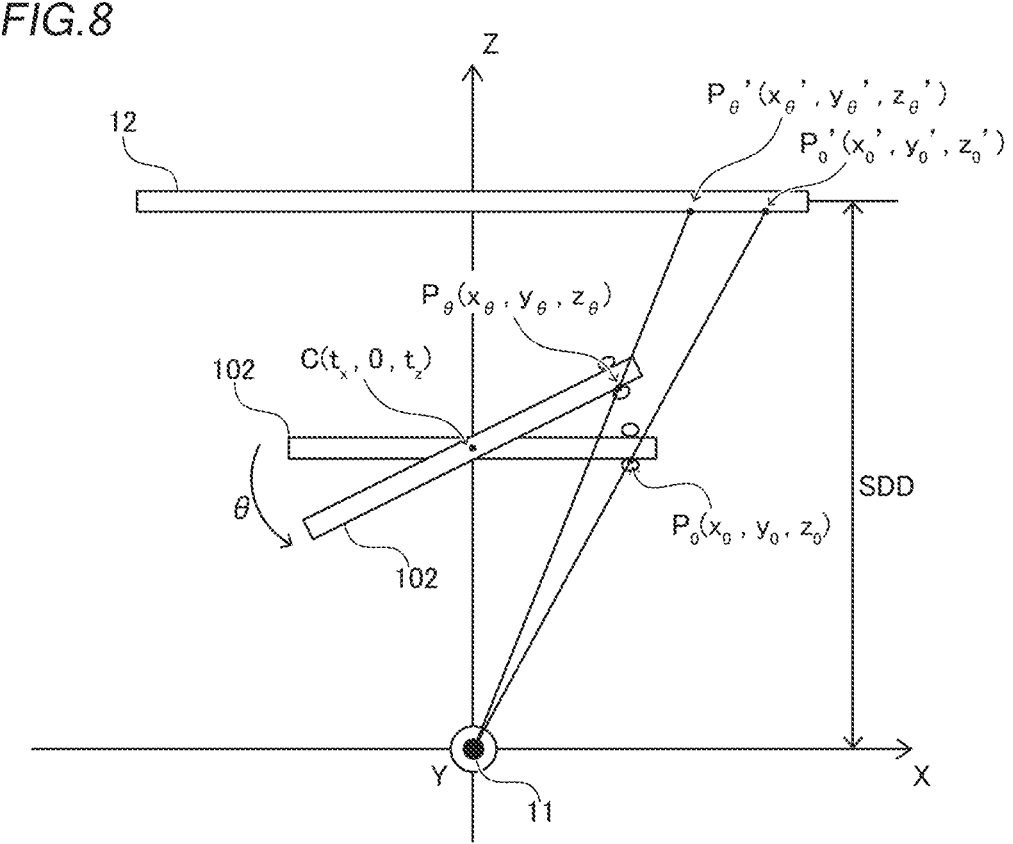
FIG. 8 is a diagram illustrating calculation of a three-dimensional position of a solder ball by using triangulation.

As shown in FIG. 8, in the first embodiment, the position calculator 44 is configured to calculate three-dimensional positions of the solder balls 104 and three-dimensional positions of the solder balls 106 based on the positions of the plurality of solder balls 104 and the plurality of solder balls 106 included in the inspection target 101 in the X-ray images 30a and 30b generated by the image generator 15, and the angle difference between the emission angles of X-rays that are emitted to generate the X-ray images 30a and 30b by using triangulation. In other words, dissimilar to CT (Computed Tomography), the position calculator 44 calculates three-dimensional positions including positions of solder balls 104 and 106 in the emission direction (Z-direction) by using triangulation without applying reconstruction processing for generating three-dimensional models to the X-ray images 30a and 30b.

Specifically, the position calculator 44 specifies a point $P_0'$ ($x_0'$, $y_0'$, $z_0'$) as a center of gravity of the area 64 in the X-ray image 30a, and a point $P_\theta'$ ($x_\theta'$, $y_\theta'$, $z_\theta'$) as a center of gravity of the area 64 in the X-ray image 30b, for example. Here, the emission angle corresponding to the X-ray image 30b is inclined by $\theta$ with respect to the emission angle corresponding to the X-ray image 30a. In this case, where a three-dimensional position of the solder ball 104 or 106 corresponding to the area 64 at the time X-rays are emitted to generate the X-ray image 30a is $P_0$ ($x_0$, $y_0$, $z_0$), a three-dimensional position of the solder ball 104 or 106 corresponding to the area 64 at the time X-rays are emitted to generate the X-ray image 30b when the emission angle is changed by $\theta$ is $P_\theta$ ($x_\theta$, $y_\theta$, $z_\theta$), and a center of rotation is C ($t_x$, 0, $t_z$), coordinates of the point $P_0$ can be represented based on calculation using triangulation by the following equations (1) and (2).

Equation 1

$$x_0 = \frac{\{t_x \sin\theta - t_z(1-\cos\theta)\}x_\theta' + \{t_x(1-\cos\theta) - t_z SDD \sin\theta\} SDD}{\left(x_\theta' + \frac{SDD^2}{x_0'}\right)\sin\theta + \left(\frac{x_\theta'}{x_0'} - 1\right) SDD \cos\theta} \quad (1)$$

$$z_0 = \frac{SDD}{x_0'} x_0 \quad (2)$$

Here, SDD is a distance between the X-ray emitter 11 and the X-ray detector 12. A value of SDD and the coordinates of the center of rotation are previously acquired from the image generator 15 and are stored. The position calculator 44 similarly calculates a three-dimensional position including a position of the area 65 in the emission direction (positions in the direction orthogonal to the substrate 102).

The equations (1) and (2) are examples of calculation, and equations different from the above equations are used in a case in which the coordinates of the center of rotation, etc. are different. Consequently, the position calculator 44 (controller 21) can calculate positions of the solder balls 104 and 106 in the emission direction (positions in the direction orthogonal to the substrate 102).

Figure 9:
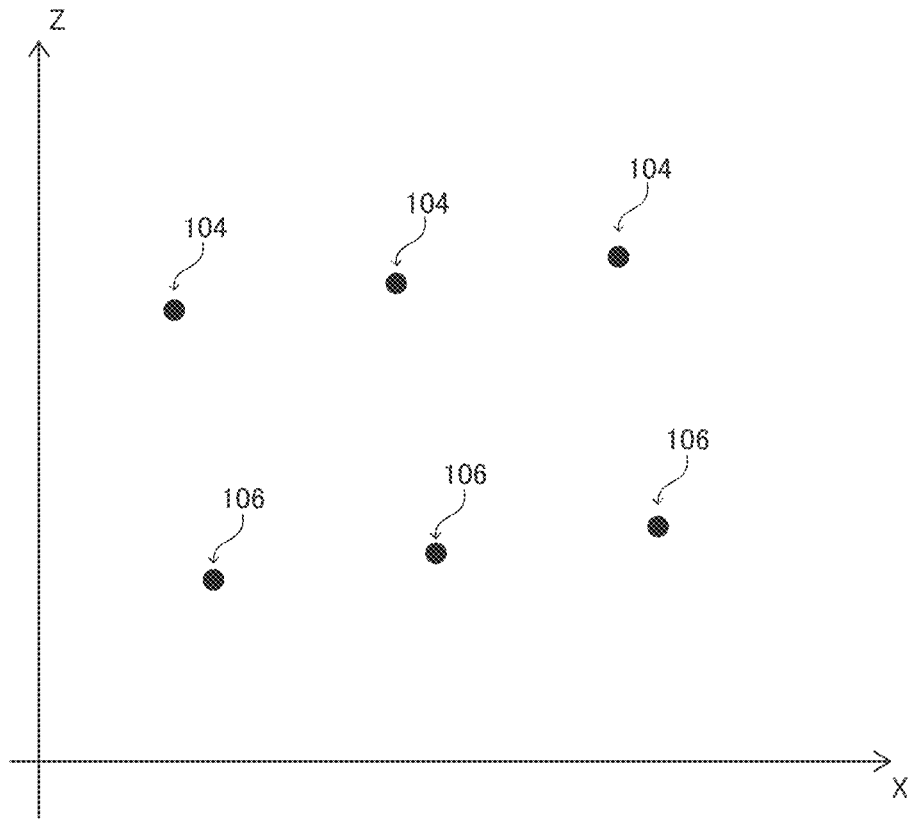
FIG. 9 is a diagram illustrating calculation results of three-dimensional positions of solder balls calculated by using triangulation.

According to results of positions calculated for the areas 64 and the areas 65 plotted as shown in FIG. 9, it is found that points that are determined as areas having larger values representing positions in the Z-direction (closer to the X-ray detector 12) can be separated from points that are determined as areas having smaller values representing positions in the Z-direction (away from the X-ray detector 12). Consequently, it can be determined which of the set of areas 64 and the set of areas 65 corresponds the plurality of solder balls 104 arranged on the Z1 direction side and which corresponds to the plurality of solder balls 106 on the Z2 direction side.

Note that each of the X-ray images 30a and 30b includes the plurality of solder balls 104 and the plurality of solder balls 106. For example, in a case in which a plurality of X-ray imaging shots are taken at a small angular interval from an X-ray imaging shot that captures the X-ray image 30a to an X-ray imaging shot that captures the X-ray image 30b while the emission angle is changed, correlation between the plurality of solder balls 104 and the plurality of solder balls 106 in the X-ray image 30a and the plurality of solder balls 104 and the plurality of solder balls 106 in the X-ray image 30b can be obtained.

The determiner 45 is configured to determine whether any defect occurs in the solder balls 104 and 106 included in the X-ray images 30a and 30b based on the discriminated areas in the discrimination result images 31a and 31b. The determiner 45 acquires, from the set of areas 64 and the set of areas 65 in the discrimination result image 31a based on the positions in the emission direction, each of which is one of the three-dimensional positions calculated by the position calculator 44, a set of areas that is discriminated as the set of areas of the solder balls 104, for example. Subsequently, the determiner 45 detects the areas of the solder balls 104 in the X-ray image 30a, and detects an area and a shape of each solder ball 104. The determiner 45 then determines based on the detected area and shape of each solder ball 104 whether any defect such as void (hole), poor wetting, solder bridging and spattering occurs in the solder ball 104. The determiner 45 can discriminatively display a defect part that is determined in the X-ray image 30a on the display 23. The determiner 45 similarly determines whether any defect occurs in the solder balls 106.

Also, the determiner 45 can determine whether an area of the detected area of each of the solder balls 104 and 106 falls within a predetermined range, and can determine based on this determination whether any defect occurs in the solder ball 104 or 106. In addition, the predetermined range used for properness in this determination can be adjusted in accordance with a calculated position (distance) of the solder ball 104 or 106 in the emission direction.

X-Ray Image Analysis Method According to First Embodiment

Figure 10:
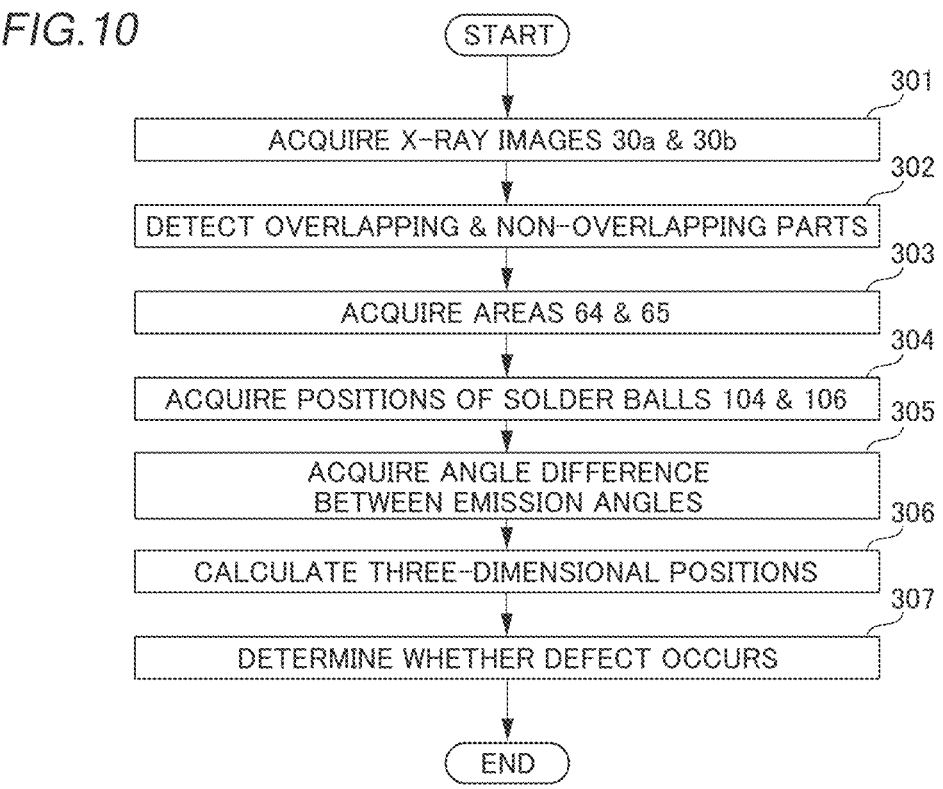
FIG. 10 is a diagram (flowchart) illustrating an X-ray image analysis method according to the first embodiment.

An X-ray image analysis method according to the first embodiment is now described with reference to FIG. 10. Control processing in steps 301 to 307 is performed by executing a program by means of the controller 21.

In step 301, X-ray images 30a and 30b as X-ray images corresponding to different emission angles are acquired. The X-ray images 30a and 30b are generated based on X-rays that are emitted to the inspection target 101 including a plurality of solder balls 104 and a plurality of solder balls 106 while an emission angle of the X-rays is changed by changing an orientation angle of the inspection target 101.

Subsequently, in step 302, overlapping and non-overlapping parts 61 and 62 are detected (estimated) as separated areas by acquiring discrimination result images 31a and 31b by using the learned model 50 based on the X-ray images 30a and 30b.

Subsequently, in step 303, areas 64 of the plurality of solder balls 104 and areas 65 of the plurality of solder balls 106 in each of X-ray images 30a and 30b are acquired with one being separated from another based on the detected overlapping and non-overlapping parts 61 and 62.

Subsequently, in step 304, positions of the plurality of solder balls 104 and positions of the plurality of solder balls 106 included in the inspection target 101 in each of the generated X-ray images 30a and 30b acquired by the image generator 15. In other words, the positions of the solder balls 104 and the solder balls 106 in the X-ray image 30a and the positions of the solder balls 104 and the solder balls 106 in the X-ray image 30b are acquired based on sets of the areas 64 and 65 as areas of the solder balls 104 and the solder balls 106 detected in step 303. Specifically, centers of gravity of the detected areas 64 and 65 are acquired.

Subsequently, in step 305, an angle difference between emission angles of X-rays that are emitted to generate the X-ray images 30a and 30b is acquired.

Subsequently, in step 306, three-dimensional positions of the solder balls 104 and three-dimensional positions of the solder balls 104 including their positions in a three-dimensional depth direction, which is the emission direction (direction orthogonal to the substrate 102 (Z-direction)), are calculated based on the positions of the plurality of solder balls 104 and the plurality of solder balls 106, which are acquired in step 304, and the angle difference, which is acquired in step 305, by using triangulation.

Subsequently, in step 307, areas of the solder balls 104 and areas of the solder balls 106 are detected based on the calculated three-dimensional positions, and it is determined whether any defect occurs in the solder balls 104 and 106.

Advantages of First Embodiment

In the first embodiment, the following advantages are obtained.

In the first embodiment, as discussed above, the X-ray imaging system 100 calculates, based on positions of solder balls 104 and 106 (target part) included in an inspection target 101 in X-ray images 30a and 30b (first and second images), and an angle difference between emission angles of X-rays that are emitted to generate the X-ray images 30a and 30b, three-dimensional positions of the solder balls 104 and 106 by using triangulation. Accordingly, it is possible to acquire the three-dimensional positions of the solder balls 104 and the solder ball 106 calculated based on the positions of the solder balls 104 and the solder balls 106 in the X-ray image 30a, the positions of the solder balls 104 and the solder balls 106 in the X-ray image 30b, and the angle difference between X-ray emission angles corresponding to the X-ray image 30a and the X-ray image 30b by using triangulation. Consequently, the inspection target 101 can be inspected with the three-dimensional positions of the solder balls 104 and the solder balls 106 being recognized. Therefore, even in a case in which the inspection target 101 including the solder balls 104 and the solder balls 106 is irradiation with X-rays so that the inspection target 101 is inspected, the inspection target can be easily inspected irrespective of three-dimensional positions of the solder balls 104 and the solder balls 106 in a depth direction.

In addition, additional advantages can be obtained by the aforementioned first embodiment added with configurations discussed below.

That is, in the first embodiment, as discussed above, the driver 14 (angle changer) is configured to change an orientation angle of the inspection target 101 with respect to the X-ray emitter 11, which is at least one of an orientation angle of the inspection target 101 with respect to the X-ray emitter 11, a position of the inspection target 101, an orientation angle of the X-ray emitter 11 with respect to the inspection target 101, and a position of the X-ray emitter 11 whereby changing the emission angle; and the controller 21 (image analyzer) calculates three-dimensional positions of the solder balls 104 and 106 (target part) by triangulation without applying reconstruction processing to the X-ray images 30a and 30b (first and second images). If three-dimensional positional relation calculated by generating a three-dimensional model by applying reconstruction processing to images, time for this calculation will be increased as compared with calculation of positional relation by using triangulation. Contrary to this, in the first embodiment, because the controller 21 is configured to calculate three-dimensional positions of the solder balls 104 and 106 (target part) by triangulation without applying reconstruction processing to the X-ray images 30a and 30b, such an increase in time for calculating three-dimensional positions of the solder balls 104 and 106 can be prevented, and the processing load of the controller 21 (image analyzer) can be reduced.

In the first embodiment, as discussed above, the inspection target 101 includes solder balls 104 (first target part) and solder balls 106 (second target part) different from each other; and the controller 21 (image analyzer) is configured to calculate three-dimensional positions of the solder balls 104 and three-dimensional positions of the solder balls 106 based on the positions of the plurality of solder balls 104 and the plurality of solder balls 106 in the X-ray images 30a and 30b generated by the image generator 15, and the angle difference between the emission angles of X-rays that are emitted to generate the X-ray images 30a and 30b by using triangulation. According to this configuration, three-dimensional positions of the solder balls 104 and three-dimensional positions of the solder balls 106 can be acquired by calculation processing using triangulation by the controller 21. Consequently, the solder balls 104 and the solder balls 106 can be discriminated from each other in each of the X-ray images 30a and 30b based on the three-dimensional positions. In addition, even in a case in which the solder balls 104 and the solder balls 106 overlap each other, three-dimensional positions of the solder balls 104 and three-dimensional positions of the solder balls 106 can be acquired, and as a result the solder balls 104 and the solder balls 106 can be inspected while the solder balls 104 and the solder balls 106 are discriminated from each other.

In the first embodiment, as discussed above, a plurality of solder balls 104 (first solder balls) are arranged in a grid arrangement on a front surface 102a of a substrate 102; a plurality of solder balls 106 (second solder balls) are arranged in a grid arrangement on a back surface 102b of the substrate 102; and the controller 21 (image analyzer) is configured to calculate three-dimensional positions of the plurality of solder balls 104 and three-dimensional positions of the plurality of solder balls 106 based on the positions of the plurality of solder balls 104 and the plurality of solder balls 106 in the X-ray images 30a and 30b (first and second images), and the angle difference between the emission angles of X-rays corresponding to the X-ray images 30a and 30b by using triangulation. According to this configuration, because three-dimensional positions of the solder balls 104 and the solder balls 106, which are arranged on the front surface 102a and the back surface 102b, respectively, can be acquired, it can be determined whether the solder balls 104 (solder balls 106) in the X-ray images 30a and 30b are located on the front surface 102a or the back surface 102b of the substrate 102 based on the acquired three-dimensional positions. Accordingly, in a case in which it is determined whether any defect occurs in the solder ball 104 or 106 based on analysis to the X-ray images 30a and 30b, it is easily determined whether a solder ball 104 or 106 that is determined as defect area is located on the front surface 102a or the back surface 102b of the substrate 102.

In the first embodiment, as discussed above, the controller 21 (image analyzer) is configured to detect areas of the solder balls 104 and the solder balls 106 (target parts) in the X-ray images 30a and 30b (first and second images), and to acquire centers of gravity of the detected areas of the solder balls 104 and the solder balls 106 as the positions of the solder balls 104 and the solder balls 106 in the X-ray images 30a and 30b. According to this configuration, even in a case in which sizes or shapes of the solder balls 104 and 106 in the X-ray images 30a and 30b are different, three-dimensional positions (coordinates) of the solder balls 104 and 106 can be acquired not by applying calculation processing to all pixels included in the areas of the solder balls 104 and 106 but by applying calculation processing to their acquired centers of gravity. For this reason, the calculation processing load of calculating three-dimensional positions of the solder balls 104 and 106 by using triangulation can be reduced by acquiring centers of gravity of the areas of the solder balls 104 and 106.

In the first embodiment, as discussed above, the controller 21 (image analyzer) is configured to detect areas of the solder balls 104 and the solder balls 106 (target parts) in the X-ray images 30a and 30b (first and second images) by using a learned model 50 produced by machine learning, and to acquire the positions of the solder balls 104 and the solder balls 106 in the X-ray images 30a and 30b based on the detected areas of the solder balls 104 and the solder balls 106. The areas can be more accurately detected in a case in which the areas are detected by using the learned model 50 produced by machine learning than in a case in which the areas are detected by binarization using a threshold. For this reason, positions of the solder balls 104 and 106 can be accurately acquired based on the detected areas by using the learned model 50. Consequently, three-dimensional positions of the solder balls 104 and the solder balls 106 calculated by using triangulation can be accurately acquired.

In the first embodiment, as discussed above, solder balls 104 (first target part) and solder balls 106 (second target part) different from each other are included; the solder balls 104 and the solder balls 106 have an overlap part where the solder balls 104 and the solder balls 106 overlap each other as viewed in an emission direction (Z-direction) extending from the X-ray emitter 11 toward the X-ray detector 12 in at least one of the X-ray images 30a and 30b (first and second images); and the controller 21 (image analyzer) is configured to detect the areas of the solder balls 104 and the areas of the solder balls 106 with one being separated from another by using the learned model 50 generated by machine learning, and to calculate three-dimensional positions of the solder balls 104 and the solder balls 106 by acquiring positions of the solder balls 104 and the solder balls 106 in the X-ray images 30a and 30b based on the detected areas of the solder balls 104 and the detected areas of the solder balls 106. According to this configuration, even if the areas of the solder balls 104 and the areas of the solder balls 106 include such an overlapping part, the areas of the solder balls 104 and the areas of the solder balls 106 can be accurately detected with one being separated from another by using the learned model 50. Consequently, an inspection target 101 can be inspected with the areas of the solder balls 104 and the areas of the solder balls 106 being separated from each other. Therefore, even in a case in which the inspection target 101 including the solder balls 104 and the solder balls 106 is irradiation with X-rays so that the inspection target 101 is inspected, the inspection target can be easily inspected irrespective of three-dimensional positions of the solder balls 104 and the solder balls 106 in a depth direction.

In the first embodiment, as discussed above, the controller 21 (image analyzer) is configured to detect areas of the solder balls 104 and areas of the solder balls 106 in the X-ray images 30a and 30b (first and second images) with one being separated from another by using the learned model 50 learning to discriminate between an overlapping part 61 that is included as both the solder balls 104 (first target part) and the solder balls 106 (second target part) as viewed in the emission direction and a non-overlapping part 62 that is included in only the solder balls 104 or the solder balls 106 based on the overlapping and non-overlapping parts 61 and 62 discriminated as separated parts. According to this configuration, because the overlapping and non-overlapping parts 61 and 62 can be discriminated as separated parts by the learned model 50, the areas of the solder balls 104 and the area of the solder ball 106 can be accurately and easily detected by combining the overlapping and non-overlapping parts 61 and 62 based on the discrimination result by the learned model 50. Consequently, even in a case in which areas of the solder balls 104 and areas of the solder balls 106 overlap each other, three-dimensional positions of the solder balls 104 and the solder balls 106 can be accurately and easily calculated by using triangulation.

Advantages of X-Ray Image Analysis Method According to First Embodiment

In the X-ray image analysis method according to the first embodiment, the following advantages are obtained.

In the X-ray image analysis method according to the first embodiment, as discussed above, based on positions of solder balls 104 and 106 (target part) included in an inspection target 101 in X-ray images 30a and 30b (first and second images), and an angle difference between emission angles of X-rays that are emitted to generate the X-ray images 30a and 30b, three-dimensional positions of the solder balls 104 and 106 are calculated by using triangulation. Accordingly, it is possible to acquire the three-dimensional positions of the solder balls 104 and the solder ball 106 calculated based on the positions of the solder balls 104 and the solder balls 106 in the X-ray image 30a, the positions of the solder balls 104 and the solder balls 106 in the X-ray image 30b, and the angle difference between X-ray emission angles corresponding to the X-ray image 30a and the X-ray image 30b by using triangulation. Consequently, the inspection target 101 can be inspected with the three-dimensional positions of the solder balls 104 and the solder balls 106 being recognized. Therefore, an X-ray image analysis method can be provided capable of easily inspecting the inspection target 101, even in a case in which the inspection target 101 including the solder balls 104 and the solder balls 106 is irradiation with X-rays so that the inspection target 101 is inspected, irrespective of three-dimensional positions of the solder balls 104 and the solder balls 106 in a depth direction.

Second Embodiment

A second embodiment is now described with reference to FIGS. 11 and 12. Dissimilar to the first embodiment configured to use the learned model 50 learning to discriminate between overlapping and non-overlapping parts 61 and 62 as separated parts, the second embodiment is configured to use a learned model 250 learning to discriminate a target area 261 including both the overlapping and non-overlapping parts without separation between the overlapping non-overlapping parts. In the figures, the same configurations as those of the first embodiment are denoted by the same reference numerals.

Overall Configuration of X-Ray Imaging System According to Second Embodiment

Figure 11:
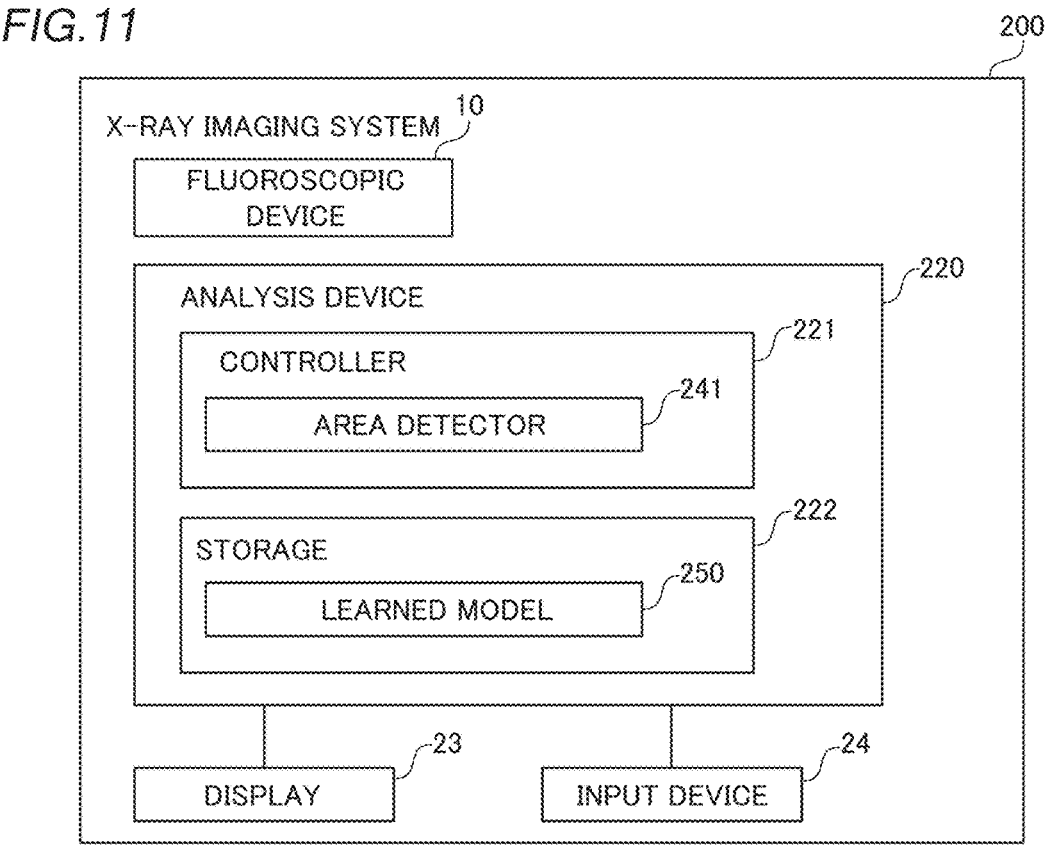
FIG. 11 is a block diagram showing the overall configuration of an X-ray imaging system according to a second embodiment of the present invention.

As shown in FIG. 11, an X-ray imaging system 200 according to the second embodiment includes a fluoroscopic device 10 and an analysis device 220. The X-ray imaging system 200 can determine whether any defect occurs in solder balls 104 and 106 in the inspection target 101 similar to the X-ray imaging system 100 according to the first embodiment. The configuration of the fluoroscopic device 10 is similar to the first embodiment. The analysis device 220 includes a controller 221 and a storage 222. The hardware configurations of the controller 221 and the storage 222 are similar to the controller 21 and storage 22 in the first embodiment, respectively.

The controller 221 includes an area detector 241. The controller 221 can serve as the area detector 241 by executing various programs (software) stored in the storage 222. In other words, the area detector 241 in FIG. 11 is represented as a functional software block. The present invention is not limited to this, but the area detector 241 can be constructed of a dedicated hardware circuit. The configurations of the controller 221 other than the area detector 241 are similar to the first embodiment. The storage 222 stores the learned model 250.

Figure 12:
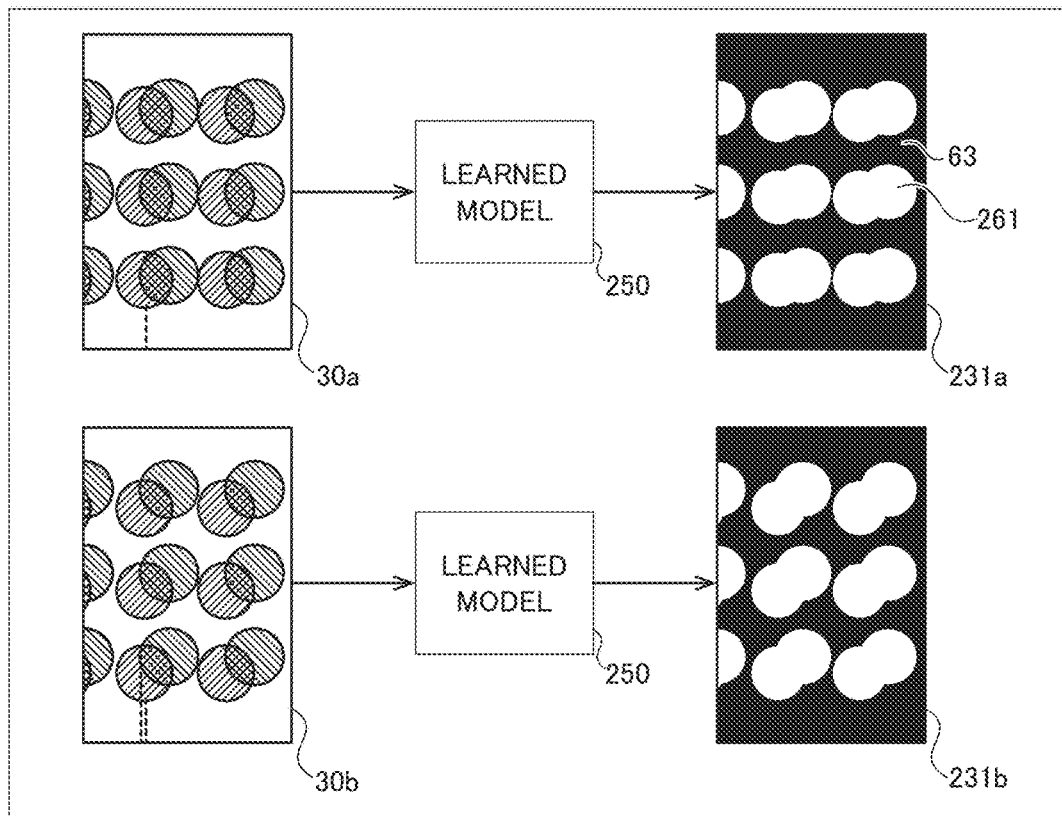
FIG. 12 is a diagram illustrating acquisition of discrimination result images by using a learned model according to the second embodiment.

Similar to the area detector 41 of the first embodiment, as shown in FIG. 12, the area detector 241 can acquire a discrimination result image 231a and a discrimination result image 231b from an X-ray image 30a and an X-ray image 30b, respectively, by using the learned model 250. Dissimilar to the first embodiment, the discrimination result images 231a and 231b are a label image in which an overlapping part where the solder ball 104 and the solder ball 106 overlap each other as viewed in the emission direction (Z-direction) and non-overlapping parts each of which is a part included in only corresponding one of the solder ball 104 and the solder ball 106 but excluded from the overlapping part (a part of one of the solder ball 104 and 106 that does not overlap another) are represented by white, and a background part 63 where neither the solder ball 104 nor the solder ball 106 exists is represented by black.

In other words, dissimilar to the learned model 50 according to the first embodiment, the learned model 250 is produced to discriminate a target area 261 including both the overlapping and non-overlapping parts without separation between the overlapping non-overlapping parts. The learned model 250 is produced by leaning to classify each pixel in input images into the target area 261 or the background part 63 and convert the pixel to white or black, respectively (image reconstruction) based on machine learning using deep learning. The area detector 241 can acquire the discrimination result images 231a and 231b in which the target areas 261 and the background part 63 are discriminated as separated parts as the discrimination result by the learned model 250 whereby discriminating the target areas 261 in the X-ray images 30a and 30b.

Subsequently, the area detector 241 detects areas having a brightness value lower than a predetermined discrimination threshold as the overlapping parts in the discriminated target areas 261. Specifically, the area detector 241 extracts only parts included in the target areas 261 in the X-ray images 30a and 30b. Subsequently, the area detector 241 applies binarization processing using a predetermined discrimination threshold to the extracted parts whereby discriminating between parts having a relatively low brightness value (dark parts) and parts having a relatively high brightness value (bright parts).

Subsequently, the area detector 241 detects areas having a brightness value lower than a predetermined discrimination threshold (relatively dark parts) as the overlapping parts. Subsequently, the area detector 241 detects areas having a brightness value higher than the predetermined discrimination threshold (relatively bright parts) as the non-overlapping parts. As a result, the area detector 241 can detect areas of the plurality of solder balls 104 and areas of the plurality of solder balls 106 in each of X-ray images 30a and 30b with one being separated from another by using control processing similar to the area detector 41 in the first embodiment based the discrimination between the overlapping and non-overlapping parts in each target area 261. Even though two sets of areas separately represent the plurality of solder balls 104 and the plurality of solder balls 106 in each of the X-ray images 30a and 30b, it cannot be determined which of the sets represents the area of the solder balls 104 and which represents the area of the solder balls 106 similar to the case of the areas 64 and 65 in the first embodiment.

Similar to the first embodiment, the controller 221 can calculate three-dimensional positions (positions in the emission direction) of the solder balls 104 and three-dimensional positions (positions in the emission direction) of the solder balls 106 based on the extracted areas of the plurality of solder balls 104 and the extracted areas of the plurality of solder balls 106 by using calculation processing using triangulation. Consequently, the controller 221 can determine whether any defect occurs in the solder balls 104 and 106 similar to the first embodiment.

The other configurations of the X-ray imaging system 200 according to the second embodiment are similar to the first embodiment.

Advantages of Second Embodiment

In the second embodiment, the following advantages are obtained.

In the second embodiment, as discussed above, the controller 221 (image analyzer) is configured to extract target areas 261 in the X-ray images 30a and 30b (first and second images) by using the learned model 250 learning without separation between an overlapping part that is included as both the solder balls 104 (first target parts) and the solder balls 106 (second target part) as viewed in the emission direction and a non-overlapping part that is included in only one of the solder balls 104 and the solder balls 106 to extract a target area 261 including both the overlapping and non-overlapping parts, and to detect areas of the solder balls 104 and the areas of the solder balls 106 in the first and second images 30*a* and 30*b* with one being separated from another by detecting an area having a brightness value lower than a predetermined discrimination threshold as the overlapping part in the extracted target areas 261. According to this configuration in which the learned model 250 learning to discriminate a target area 261 including both the overlapping and non-overlapping parts without separation between the overlapping non-overlapping parts is used, when teacher data to produce the learned model 250 is created, the teacher data can be easily created as compared with a case in which teacher data is created to discriminate between overlapping and non-overlapping parts. Consequently, a burden of producing the learned model 250 can be reduced.

The other advantages of the second embodiment are similar to the first embodiment.

Modified Embodiment

Note that the embodiment disclosed this time must be considered as illustrative in all points and not restrictive. The scope of the present invention is not shown by the above description of the embodiments but by the scope of claims for patent, and all modifications (modified examples) within the meaning and scope equivalent to the scope of claims for patent are further included.

While the example in which three-dimensional positions of the solder balls 104 and 106 having an overlapping part are calculated has been shown in the aforementioned first and second embodiments, the present invention is not limited to this. In the present invention, three-dimensional positions of target parts having no overlapping part as viewed in the X-ray emission direction may be calculated. Also, the target part may be not a solder ball but a void (hole) included in an inspection target, and a three-dimensional position of the void may be calculated. In this case, the inspection target not limited to an electronic device including a substrate, but may be a molded product formed of metal, resin, etc.

While the example in which centers of gravity of the detected areas of the solder balls 104 and 106 (target parts) are acquired as the positions of the solder balls 104 and the solder balls 106 has been shown in the aforementioned first and second embodiments, the present invention is not limited to this. In the present invention, positions other than centers of gravity of the detected areas of the solder balls 104 and the solder balls 106 are acquired as the positions of the solder balls 104 and the solder balls 106.

While the example in which areas of the solder balls 104 and the solder balls 106 (target parts) in each of X-ray images 30*a* and 30*b* (first and second images) are detected by using the learned model 50 (250) produced based on machine learning has been shown in the aforementioned first and second embodiments, the present invention is not limited to this. In the present invention, areas of target parts may be detected by applying image processing, such as binarization, to the first and second images without using the learned model.

While the example in which the driver 14 (angle changer) is configured to change an orientation angle of the inspection target 101 with respect to the X-ray emitter 11 whereby changing an emission angle of X-rays with which the inspection target 101 is irradiated has been shown in the aforementioned first and second embodiments, the present invention is not limited to this. In the present invention, the angle changer may be configured to change an orientation angle of the X-ray emitter with respect to the inspection target (emission direction of X-rays emitted from the X-ray emitter to the X-ray detector) whereby changing an emission angle of X-rays emitted to the inspection target. For example, the emission angle may be changed by rotating the X-ray emitter and the X-ray detector without changing an orientation angle of the inspection target. Also, the emission angle may be changed by changing a position of the inspection target or a position of the X-ray emitter.

While the example in which the image generator 15 configured to generate the X-ray image 30*a* (first image) and X-ray image 30*b* (second image) is provided separately from the controller 21 (image analyzer) configured to analyze three-dimensional positions of the solder balls 104 and 106 (target parts) included in the X-ray images 30*a* and 30*b* by using triangulation has been shown in the aforementioned first and second embodiments, the present invention is not limited to this. In the present invention, one control device may perform both the generation of the first image and the second image, and the analysis of three-dimensional positions of the target parts using triangulation.

While the example in which based on the X-ray image 30*a* (first image) and the X-ray image 30*b* (second image) corresponding to different emission angles three-dimensional positions of solder balls 104 (first target part) and solder balls 106 (second target part) included in the X-ray images 30*a* and 30*b* are calculated by using triangulation, and it is determined by using the calculated three-dimensional positions whether any defect occurs in the solder balls 104 and 106 has been shown in the aforementioned first and second embodiments, the present invention is not limited to this. In the present invention, areas of first and second target parts in one X-ray image may be detected with one being separated from another by using the learned model without calculating three-dimensional positions of the first and second target parts, and it may be determined whether any defect occurs in the first and second target parts based on the detected areas of the first and second target parts with one being separated from another.

Modes

The aforementioned exemplary embodiment will be understood as concrete examples of the following modes by those skilled in the art.

(Mode Item 1)

An X-ray imaging system includes an X-ray emitter configured to emit X-rays to an inspection target including an target part; an X-ray detector configured to detect the X-rays emitted from the X-ray emitter; an angle changer configured to change an emission angle of the X-rays to be emitted to the inspection target; an image generator configured to generate first and second images as X-ray images corresponding to different emission angles different from each other based on X-rays that are detected by the X-ray detector in irradiation of the inspection target with the X rays by the X-ray emitter under change of the emission angle by the angle changer; and an image analyzer configured to calculate a three-dimensional position of the target part by using triangulation based on positions of the target part included in the inspection target in the first and second images, which are generated by the image generator, and an angle difference between the different emission angles of the X-rays that are emitted to generate the first and second images.

(Mode Item 2)

The X-ray imaging system according to the mode item 1, wherein the angle changer is configured to change at least one of an orientation angle of the inspection target with respect to the X-ray emitter, a position of the inspection target, an orientation angle of the X-ray emitter with respect to the inspection target, and a position of the X-ray emitter whereby changing the emission angle; and the image analyzer is configured to calculate the three-dimensional position of the target part by using triangulation without reconfiguration processing on the first and second images.

(Mode Item 3)

The X-ray imaging system according to the mode item 1 or 2, wherein the target part includes first and second target parts different from each other; and the image analyzer is configured to calculate three-dimensional positions of the first and second target parts by using triangulation based on positions of the first and second target parts, in the first and second images, which are generated by the image generator, and an angle difference between the different emission angles of the X-rays that are emitted to generate the first and second images.

(Mode Item 4)

The X-ray imaging system according to the mode item 3, wherein the first target part includes a plurality of first solder balls arranged in a grid arrangement on a front surface of a substrate; the second target part includes a plurality of second solder balls arranged in a grid arrangement on a back surface of the substrate; and the image analyzer is configured to calculate three-dimensional positions of the plurality of first solder balls and the plurality of second solder balls by using triangulation based on positions of the plurality of first solder balls and the plurality of second solder balls in the first and second images, and an angle difference between the different emission angles corresponding to the first and second images.

(Mode Item 5)

The X-ray imaging system according to any of the mode items 1 to 4, wherein the image analyzer is configured to detect areas of the target part in the first and second images, and to acquire centers of gravity of the detected areas of the target part as the positions of the target part in the first and second images.

(Mode Item 6)

The X-ray imaging system according to any of the mode items 1 to 5, wherein the image analyzer is configured to detect areas of the target part in the first and second images by using a learned model generated by machine learning, and to acquire the positions of the target part in the first and second images based on the detected areas of the target part.

(Mode Item 7)

The X-ray imaging system according to the mode item 6, wherein the target part includes first and second target parts different from each other; the first and second target parts have an overlap part where the first and second target parts overlap each other as viewed in an emission direction extending from the X-ray emitter toward the X-ray detector in at least one of the first and second images; and the image analyzer is configured to detect areas of the first and second target parts with one being separated from another by using the learned model generated by machine learning, and to calculate three-dimensional positions of the first and second target parts in the first and second images by acquiring positions of the first and second target parts based on the detected areas of the first and second target parts.

(Mode Item 8)

The X-ray imaging system according to the mode item 7, wherein the image analyzer is configured to detect areas of the first and second target parts in the first and second images with one being separated from another based on an overlapping part and a non-overlapping part discriminated as separated parts by using the learned model learning to discriminate between the overlapping part that is included as both the first and second target parts as viewed in the emission direction and the non-overlapping part that is included in only one of the first and second target parts.

(Mode Item 9)

The X-ray imaging system according to the mode item 7, wherein the image analyzer is configured to discriminate target areas in the first and second images by using the learned model learning without separation between an overlapping part that is included as both the first and second target parts as viewed in the emission direction and a non-overlapping part that is included in only one of the first and second target parts to discriminate the target areas including both the overlapping and non-overlapping parts, and to detect areas of the first and second target parts in the first and second images with one being separated from another by detecting an area having a brightness value lower than a predetermined discrimination threshold as the overlapping part in the discriminated target areas.

(Mode Item 10)

An X-ray imaging system includes an X-ray emitter configured to emit X-rays to an inspection target including first and second target parts different from each other; an X-ray detector configured to detect the X-rays emitted from the X-ray emitter; an image generator configured to generate an X-ray image based on X-rays that are detected by the X-ray detector in irradiation of the inspection target with the X rays by the X-ray emitter; and an image analyzer configured to detect areas of the first and second target parts in the X-ray image with one being separated from another based on an overlapping part and a non-overlapping part discriminated as separated parts by using a learned model learning to discriminate between the overlapping part that is included as both the first and second target parts in the X-ray image, which is generated by the image generator, as viewed in an emission direction extending from the X-ray emitter toward the X-ray detector and the non-overlapping part that is included in only one of the first and second target parts.

(Mode Item 11)

An X-ray image analysis method includes a step of acquiring first and second images of an inspection target including a target part as X-ray images corresponding to different emission angles different from each other generated based on X-rays that are detected in irradiation of the inspection target with the X rays under change of an emission angle with respect to the inspection target; and a step of calculating a three-dimensional position of the target part by using triangulation based on positions of the target part, which is included in the inspection target, in the first and second images, and an angle difference between the different emission angles of the X-rays that are emitted to generate the first and second images.

The invention claimed is:

1. An X-ray imaging system comprising:
an X-ray emitter configured to emit X-rays to an inspection target including a target part;
an X-ray detector configured to detect the X-rays emitted from the X-ray emitter;
an angle changer configured to change an emission angle of the X-rays to be emitted to the inspection target;

an image generator configured to generate first and second images as X-ray images corresponding to different emission angles different from each other based on X-rays that are detected by the X-ray detector in irradiation of the inspection target with the X rays by the X-ray emitter under change of the emission angle by the angle changer, wherein the first image is based on a first emission angle and the second image is based on a second emission angle which differs from the first emission angle by a nonzero angle θ; and an image analyzer configured to calculate a three-dimensional position of the target part by using triangulation based on positions of the target part included in the inspection target in the first and second images, which are generated by the image generator, and an angle difference between the different emission angles of the X-rays that are emitted to generate the first and second images.

2. The X-ray imaging system according to claim 1, wherein
the angle changer is configured to change at least one of an orientation angle of the inspection target with respect to the X-ray emitter, a position of the inspection target, an orientation angle of the X-ray emitter with respect to the inspection target, and a position of the X-ray emitter whereby changing the emission angle; and
the image analyzer is configured to calculate the three-dimensional position of the target part by using triangulation without reconfiguration processing on the first and second images.

3. The X-ray imaging system according to claim 1, wherein
the target part includes first and second target parts different from each other; and
the image analyzer is configured to calculate three-dimensional positions of the first and second target parts by using triangulation based on positions of the first and second target parts, in the first and second images, which are generated by the image generator, and an angle difference between the different emission angles of the X-rays that are emitted to generate the first and second images.

4. The X-ray imaging system according to claim 3, wherein
the first target part includes a plurality of first solder balls arranged in a grid arrangement on a front surface of a substrate;
the second target part includes a plurality of second solder balls arranged in a grid arrangement on a back surface of the substrate; and
the image analyzer is configured to calculate three-dimensional positions of the plurality of first solder balls and the plurality of second solder balls by using triangulation based on positions of the plurality of first solder balls and the plurality of second solder balls in the first and second images, and an angle difference between the different emission angles corresponding to the first and second images.

5. The X-ray imaging system according to claim 1, wherein the image analyzer is configured to detect areas of the target part in the first and second images, and to acquire centers of gravity of the detected areas of the target part as the positions of the target part in the first and second images.

6. The X-ray imaging system according to claim 1, wherein the image analyzer is configured to detect areas of the target part in the first and second images by using a learned model generated by machine learning, and to acquire the positions of the target part in the first and second images based on the detected areas of the target part.

7. An X-ray imaging system comprising:
an X-ray emitter configured to emit X-rays to an inspection target including a target part;
an X-ray detector configured to detect the X-rays emitted from the X-ray emitter;
an angle changer configured to change an emission angle of the X-rays to be emitted to the inspection target;
an image generator configured to generate first and second images as X-ray images corresponding to different emission angles different from each other based on X-rays that are detected by the X-ray detector in irradiation of the inspection target with the X rays by the X-ray emitter under change of the emission angle by the angle changer; and
an image analyzer configured to calculate a three-dimensional position of the target part by using triangulation based on positions of the target part included in the inspection target in the first and second images, which are generated by the image generator, and an angle difference between the different emission angles of the X-rays that are emitted to generate the first and second images,
wherein the image analyzer is configured to detect areas of the target part in the first and second images by using a learned model generated by machine learning, and to acquire the positions of the target part in the first and second images based on the detected areas of the target part, and
wherein
the target part includes first and second target parts different from each other;
the first and second target parts have an overlap part where the first and second target parts overlap each other as viewed in an emission direction extending from the X-ray emitter toward the X-ray detector in at least one of the first and second images; and
the image analyzer is configured to detect areas of the first and second target parts with one being separated from another by using the learned model generated by machine learning, and to calculate three-dimensional positions of the first and second target parts in the first and second images by acquiring positions of the first and second target parts based on the detected areas of the first and second target parts.

8. The X-ray imaging system according to claim 7, wherein the image analyzer is configured to detect areas of the first and second target parts in the first and second images with one being separated from another based on an overlapping part and a non-overlapping part discriminated as separated parts by using the learned model learning to discriminate between the overlapping part that is included as both the first and second target parts as viewed in the emission direction and the non-overlapping part that is included in only one of the first and second target parts.

9. The X-ray imaging system according to claim 7, wherein the image analyzer is configured to discriminate target areas in the first and second images by using the learned model learning without separation between an overlapping part that is included as both the first and second target parts as viewed in the emission direction and a non-overlapping part that is included in only one of the first and second target parts to discriminate the target areas including both the overlapping and non-overlapping parts, and to detect areas of the first and second target parts in the first and second images with one being separated from another by detecting an area having a brightness value lower than a predetermined discrimination threshold as the overlapping part in the discriminated target areas.

10. An X-ray imaging system comprising:
- an X-ray emitter configured to emit X-rays to an inspection target including first and second target parts different from each other;
- an X-ray detector configured to detect the X-rays emitted from the X-ray emitter;
- an image generator configured to generate an X-ray image based on X-rays that are detected by the X-ray detector in irradiation of the inspection target with the X rays by the X-ray emitter; and
- an image analyzer configured to detect areas of the first and second target parts in the X-ray image with one being separated from another based on an overlapping part and a non-overlapping part discriminated as separated parts by using a learned model learning to discriminate between the overlapping part that is included as both the first and second target parts in the X-ray image, which is generated by the image generator, as viewed in an emission direction extending from the X-ray emitter toward the X-ray detector and the non-overlapping part that is included in only one of the first and second target parts.

11. An X-ray image analysis method comprising:
- a step of acquiring first and second images of an inspection target including a target part as X-ray images corresponding to different emission angles different from each other generated based on X-rays that are detected in irradiation of the inspection target with the X rays under change of an emission angle with respect to the inspection target, wherein the first image is based on a first emission angle and the second image is based on a second emission angle which differs from the first emission angle by a nonzero angle $\theta$; and
- a step of calculating a three-dimensional position of the target part by using triangulation based on positions of the target part, which is included in the inspection target, in the first and second images, and an angle difference between the different emission angles of the X-rays that are emitted to generate the first and second images.

* * * * *